United States Patent [19]
Yoshida et al.

[11] Patent Number: 5,813,281
[45] Date of Patent: Sep. 29, 1998

[54] DEVICE FOR REDUCING TORQUE VARIATIONS FOR USE IN DRIVE APPARATUS

[75] Inventors: Kiyomi Yoshida; Fumiyuki Iwano; Michio Ueda, all of Tokushima, Japan

[73] Assignee: Shikoku Kakoki Co., Ltd., Tokushima, Japan

[21] Appl. No.: 565,583

[22] Filed: Nov. 30, 1995

[30] Foreign Application Priority Data

Dec. 1, 1994 [JP] Japan ................................. 6-298133
Jun. 15, 1995 [JP] Japan ................................. 7-148989

[51] Int. Cl.⁶ .................................................. F16H 21/38
[52] U.S. Cl. ....................... 74/36; 74/49; 74/53; 74/592
[58] Field of Search ................................. 74/36, 49, 53, 74/55, 41, 592

[56] References Cited

U.S. PATENT DOCUMENTS

| | | | |
|---|---|---|---|
| 377,225 | 1/1888 | Barr | 74/592 |
| 1,688,484 | 1/1928 | Carter | 74/582 X |
| 1,913,225 | 6/1933 | Young | 74/592 X |
| 3,413,862 | 12/1968 | Waara | 74/53 |
| 3,449,888 | 6/1969 | Gausman | 53/182 |
| 4,334,437 | 6/1982 | Andersson | 74/36 X |

FOREIGN PATENT DOCUMENTS

| | | |
|---|---|---|
| 0 291 092 A2 | 11/1988 | European Pat. Off. . |
| 1263434 | 3/1968 | Germany . |
| 1500875 | 2/1970 | Germany . |
| 33 38 105 A1 | 10/1983 | Germany . |
| 3714637 | 12/1988 | Germany . |
| 2233728 | 1/1991 | United Kingdom . |

OTHER PUBLICATIONS

European Search Report dated Jul. 12, 1996 listing above cited references.

*Primary Examiner*—Allan D. Herrmann
*Attorney, Agent, or Firm*—Armstrong, Westerman, Hattori, McLeland & Naughton

[57] ABSTRACT

A device for reducing torque variations for use in a drive apparatus which has a drive shaft for causing a lift unit to perform one cycle of up-and-down movement for each of at least two lift units to perform one cycle of up-and-down movement at a specified interval by one turn of rotation of the drive shaft. The device comprises elastic means and transmission means for transmitting an elastic force of the elastic means to the drive shaft as a rotational torque.

7 Claims, 9 Drawing Sheets

DEVICE FOR REDUCING TORQUE VARIATIONS FOR USE IN DRIVE APPARATUS

BACKGROUND OF THE INVENTION

The present invention relates to a device for reducing variations in a torque for use in drive apparatus, for example, for driving lift units equipped with container forming jaws and included in a container forming machine which is adapted to make a content-filled vertical tube into baglike containers by sealing the tube at a spacing corresponding to the length of the container and cutting the sealed portions.

Such an apparatus is already known as disclosed, for example, in JP-A-55-57747 (1980). The disclosed apparatus comprises first and second hydraulic cylinders which are connected together in series. The first hydraulic cylinder has a piston rod connected to a lift unit, and the second hydraulic cylinder has a piston rod connected to the frame of the device. The first cylinder is operated so as to be in balance with the weight of the lift unit. The second cylinder is operated for raising the lift unit.

The apparatus described requires the pair of first and second hydraulic cylinders for one lift unit and therefore necessitates pairs of first and second hydraulic cylinders for a plurality of lift units. Thus, the apparatus has the problem of being complex in construction and costly.

SUMMARY OF THE INVENTION

An object of the present invention is to overcome the above problem and provide a device for reducing torque variations which is simple in construction and less costly for use in drive apparatus.

For use in a drive apparatus having a drive shaft for causing a lift unit to perform one cycle of up-and-down movement or each of at least two lift units to perform one cycle of up-and-down movement at a specified interval by one turn of rotation of the drive shaft, the present invention provides a device for reducing torque variations which comprises elastic means and transmission means for transmitting an elastic force of the elastic means to the drive shaft as a rotational torque. Accordingly, the elastic force of the elastic means acts on the drive shaft as a positive torque and a negative torque. The invention therefore diminishes the variations in the torque of the drive shaft by a simple and inexpensive mechanism.

In the case where one turn of rotation of the drive shaft involves one cycle of torque variations, the transmission means may comprise an arm fixed to the drive shaft and having a forward end for the elastic force of the elastic means to act on. The elastic force of the elastic means is then transmitted to the drive shaft by the arm. This provides a grealy simplied mechanism for reducing torque variations.

The transmission means may comprise a main gear fixed to the drive shaft, a driven gear coupled to the main gear for power transmission therebetween, a driven shaft having the driven gear fixed thereto, and an arm fixed to the driven shaft and having a forward end for the elastic force of the elastic means to act on. When the number of cycles of torque variations involved in one turn of rotation of the drive shaft is n (integer), the gear ratio of the main gear to the driven gear is n:1. The speed of rotation of the drive gear is then transmitted to the drive shaft on being increased and decreased in corresponding relation with the number of torque variation cycles, so that the driven shaft acts to offset the combined torque variations which are repeated periodically. This effectively reduces the torque variations.

Preferably, the lift units are two in number, and the torque of the drive shaft is adapted to reach a positive maximum value and a negative maximum value each twice alternately during the rotation of the drive shaft through 360 degrees for one cycle. The transmission means comprises a main gear fixed to the drive shaft, a driven gear coupled to the main gear for power transmission, a driven shaft having the driven gear fixed thereto, and an arm fixed to the driven shaft and to be acted on by the elastic force of the elastic means so that the torque of the driven shaft reaches a positive maximum value and a negative maximum value each once during the rotation of the driven shaft through 360 degrees for one cycle. The gear ratio of the main gear to the driven gear is 2:1, and the drive shaft and the driven shaft are so timed as to be approximately reverse in the phase of their positive and negative torque maximum values. The positive and negative torque maximum values of the drive shaft are then offset respectively by the negative and positive torque maximum values of the driven shaft. This reduces the torque variations of the drive shaft very effectively.

The 360-degree cycle of the drive shaft includes 90-degree rotation assigned to an ascent stroke of the lift unit, with the remaining 270-degree rotation assigned to a descent stroke of the lift unit. The variations in the torque acting on the drive shaft are then approximate a sine curve and can therefore be reduced readily.

When the piston rod of a hydraulic cylinder is connected to the forward end of the arm, an offsetting force is available from the cylinder, and since a torque approximating a sine curve is exerted on the driven shaft, the torque variations of the drive shaft can be reduced more effectively.

When a spring is interposed between the forward end of the arm and a support member, the elastic force to be applied to the arm can be readily obtained from this simple means.

Preferably, the main gear and the driven gear are each a spur gear and in mesh with each other.

Alternatively, the main gear and the driven gear may each be a sprocket, with a chain or toothed belt reeved around the main gear and the driven gear.

Preferably, the lift unit is equipped with container forming jaws for making a content-filled vertical tube into baglike containers by sealing the tube at a spacing corresponding to the length of the container and cutting the sealed portions, the drive shaft has fixed thereto cams equal in number to the number of lift units, and the cam is provided with a cam follower connected to the lift unit.

DESCRIPTION OF THE PREFERRED EMBODIMENTS

Embodiments of the invention will be described next with reference to the drawings.

In the following description, the term "front" refers to the side toward the direction of arrow A in FIG. 1, the term "rear" to the opposite side, and the terms "right" and "left" are used for the device as it is seen from behind.

Figure 1:
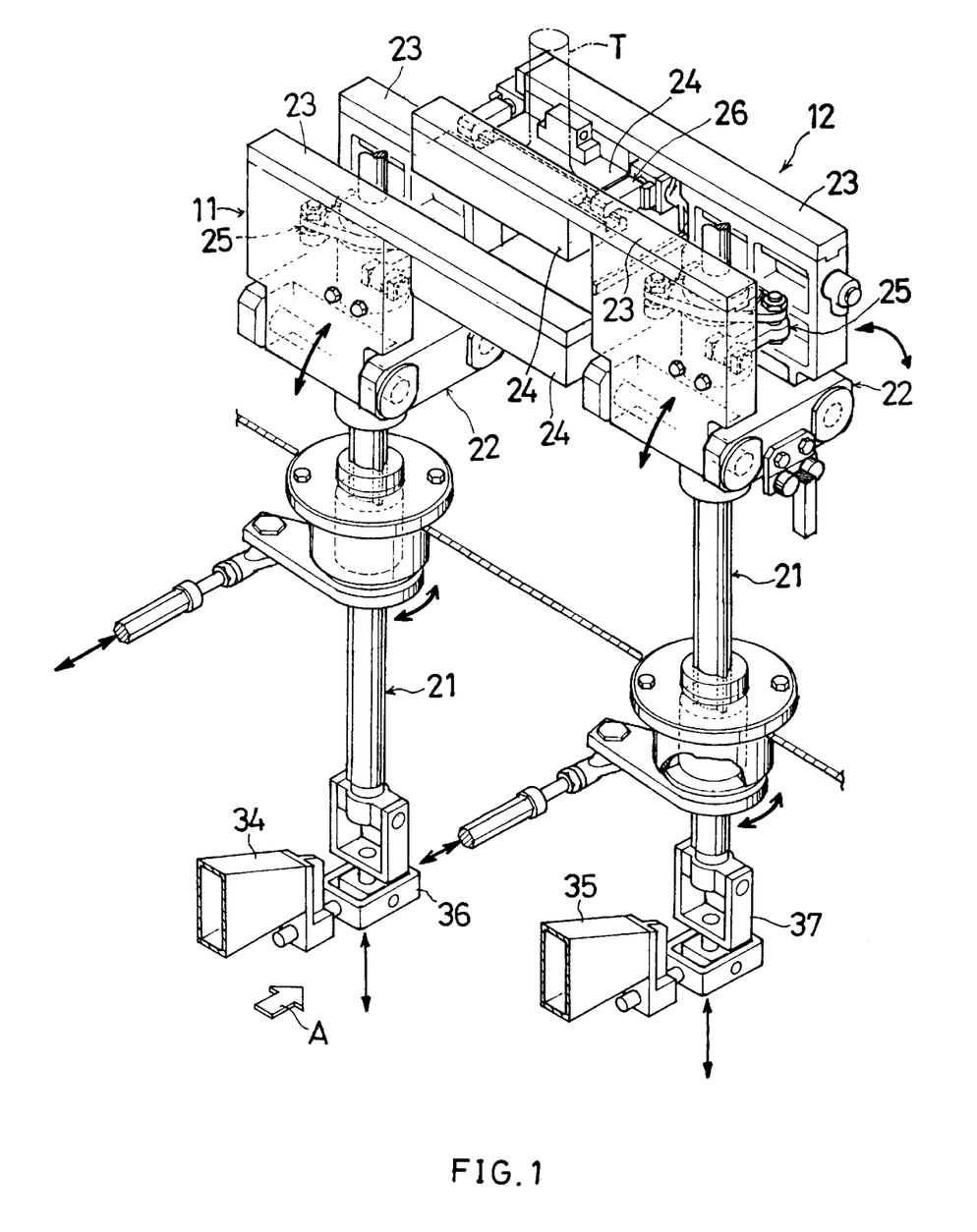
FIG. 1 is a perspective view showing jaw units of a container forming apparatus including a device of the invention for reducing torque variations.
Figure 2:
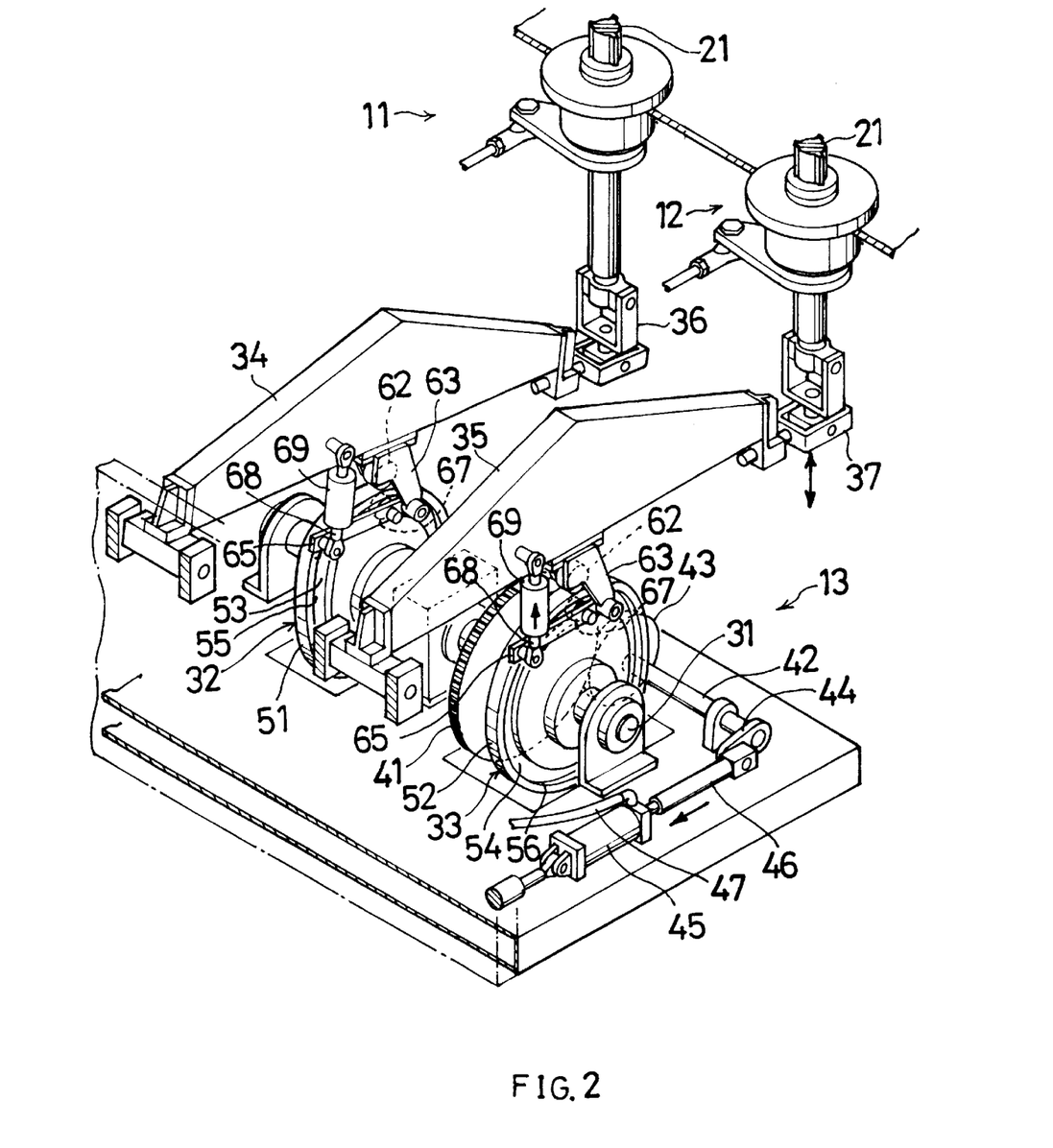
FIG. 2 is a perspective view showing the drive mechanism of the apparatus.

With reference to FIGS. 1 and 2, a container forming apparatus comprises left and right jaw units 11, 12 for holding a content-filled heat-sealable tube T thereacross to form sealed portions having a width and cutting the sealed portions each at the midportion of the width, and a drive mechanism 13 for moving these jaw units 11, 12 alternately up and down in different directions as timed with each other with a stroke length corresponding to the length of the container to be made.

The jaw units 11, 12 have the same construction although oriented in opposite directions transversely of the apparatus. The right jaw unit 12 only will be described below, and like parts of these units 11, 12 are designated by like reference numerals and will not be described repeatedly.

The jaw unit 12 comprises a vertical rod 21 which is movable up and down and reversibly rotatable, a lift frame 22 movable up and down with the vertical rod 21 and mounted on the rod 21 so as to permit the reversible rotation thereof, a pair of front and rear pivotal arms 23 supported at their lower portions by the lift frame 22 so as to be movable respectively about a pair of horizontal axes parallel to each other, a pair of front and rear jaws 24 fixed to the upper portions of the respective pivotal arms 23 and opposed to each other, an arm opener 25 for pivotally moving the arms 23 between a closed position where the jaws 24 are close to each other and an opened position where the jaws are away from each other, and a press 26 for producing a sealing pressure between the jaws 24 by pulling the pivotal arms 23 toward each other at the closed position.

Although not shown, the front jaw 24 is provided with a heater for heat sealing, and the rear jaw 24 with a cutter.

When one of the lift frames 22 moves upward, the other lift frame 22 moves down. When the lift frame 22 is in the upper limit position of its up-and-down stroke, the arm opener 25 closes the two pivotal arms 23 to position the jaws 24 close to each other, and the press 26 pulls the arms 23 toward each other to hold the tube T between the jaws 24 and produce a sealing pressure therebetween, whereby the tube T is sealed. The jaws 24 holding the tube T therebetween descend with the lift frame 22, thereby transporting the tube T by a length corresponding to one container. Upon the lift frame 22 reaching the lower limit position of the stroke, the cutter is actuated to cut the tube T. The press 26 is then brought out of pressing operation, whereupon the arm opener 25 opens the pivotal arms 23 to open the jaws 24 and release the tube T. Thus, the leading end portion of the tube corresponding to one container is separated from the other portion.

Figure 3:
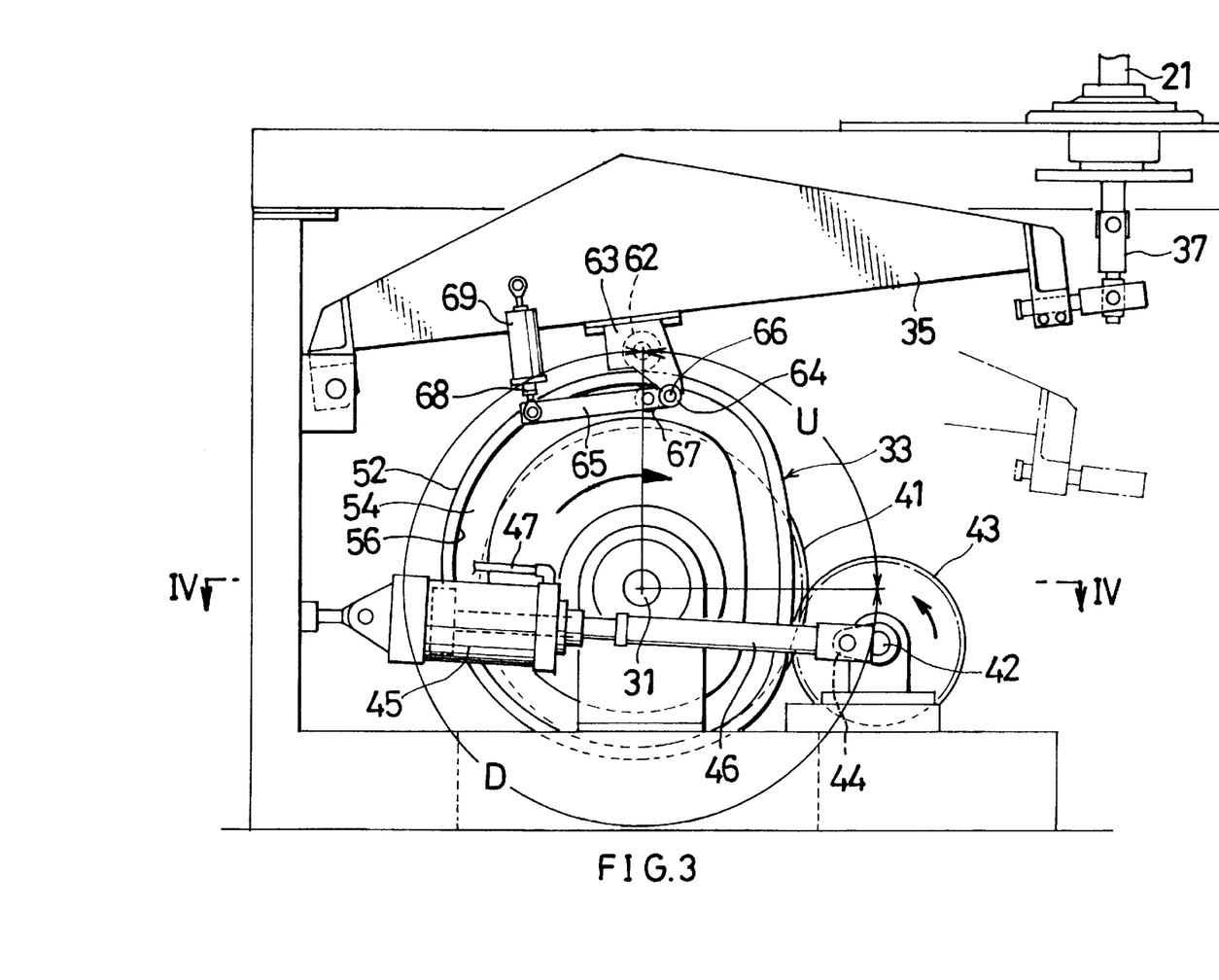
FIG. 3 is a side elevation showing the drive mechanism of the apparatus.

The drive mechanism 13 comprises a horizontal drive shaft 31 extending transversely of the apparatus and disposed in the rear of the lower ends of the vertical rods 21 obliquely therebelow, a left jaw unit cam 32 and right jaw unit cam 33 fixed to the drive shaft 31, and an armlike cam follower 34 and similar cam follower 35 extending over the respective cams 32, 33. Although not shown, an arm opening cam is also fixed to the drive shaft 31.

The cam follower 34 for the left jaw unit 11 has a front end connected to the lower end of the vertical rod 21 of the unit 11 by a connecting member 36. The cam follower 35 for the right jaw unit 12 has a front end connected to the lower end of the vertical rod 21 of the unit 12 by a connecting member 37.

Figure 4:
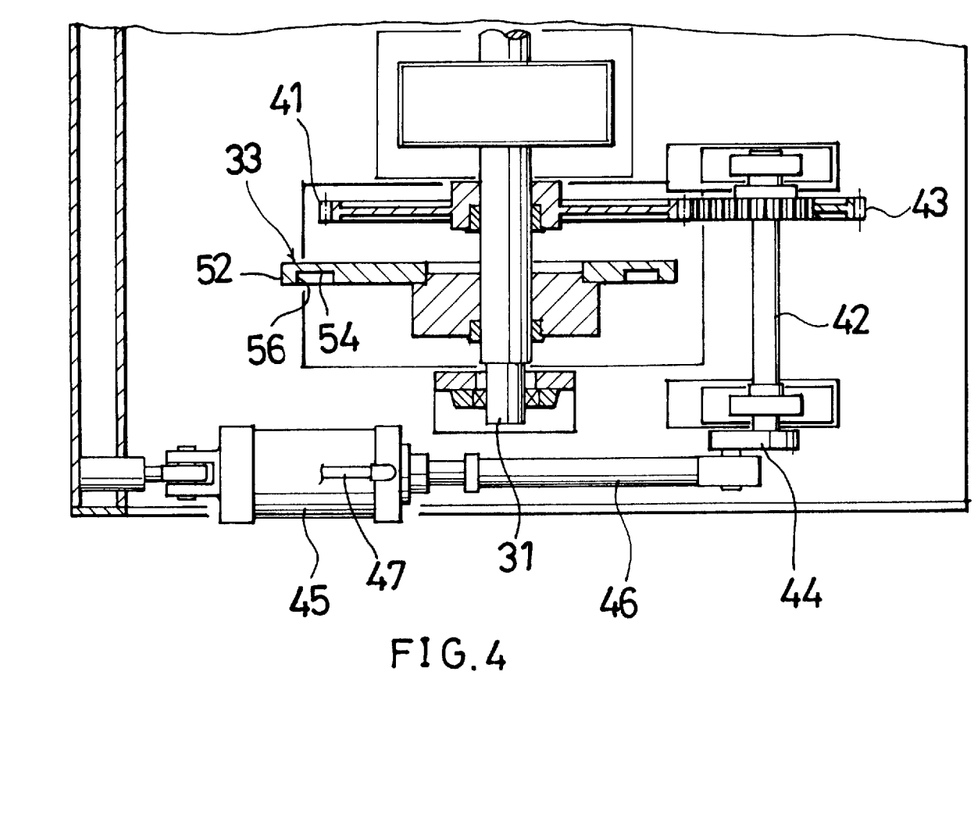
FIG. 4 is a view in section taken along the line IV—IV in FIG. 3.

At the left side of the right jaw unit cam 33, a main gear 41 is fixedly mounted on the drive shaft 31. Disposed in front of the drive shaft 31 is a horizontal driven shaft 42 extending transversely of the apparatus in parallel to the shaft 31. The driven shaft 42 fixedly carries a driven gear 43 meshing with the main gear 41. The gear ratio of the main gear 41 to the driven gear 43 is 2:1. An arm 44 is secured to the right end of the driven shaft 42 and has an outer end connected to the piston rod 46 of a hydraulic cylinder 45. One end of a pressurized air supply tube 47 is connected to the rod side of the cylinder 45. The other end of the supply tube 47 is connected to an unillustrated air tank, whereby pressurized air of constant pressure free of pressure variations is supplied to the hydraulic cylinder 45 for urging the piston rod 46 toward a retracted position at all times.

The cams 32 and 33 have the same shape and are each in the form of a plate cam having an outer periphery serving as a cam contour face 51 or 52. The perimeter of the cam contour face 52 subtends 360 degrees and includes a 90-degree portion which is shown as an ascent range U in FIG. 3 and assigned to the ascent stroke of the lift frame 22, the remaining 270-degree portion being shown as a descent range D and assigned to the descent stroke of the lift frame 22. The ascent range U, as well as the descent range D, of the left jaw unit cam 32 is different from the corresponding range of the right jaw unit cam 33 by 180 degrees in phase.

The cam 32 (33) is formed in its right side with an annular recessed portion 53 (54) close to the outer periphery thereof and having an inwardly facing periphery, which provides a guide face 55 (56) extending along the cam contour face 51 (52). The guide face 55 (56) is parallel to the cam contour face 51 (52) where the contour face is in the form of a circular arc but is slightly not parallel to the portion of the contour face 51 (52) which varies in curvature to make the fixed roller 62 and movable roller 67 to be described below identical in cam lift phase.

Figure 5:
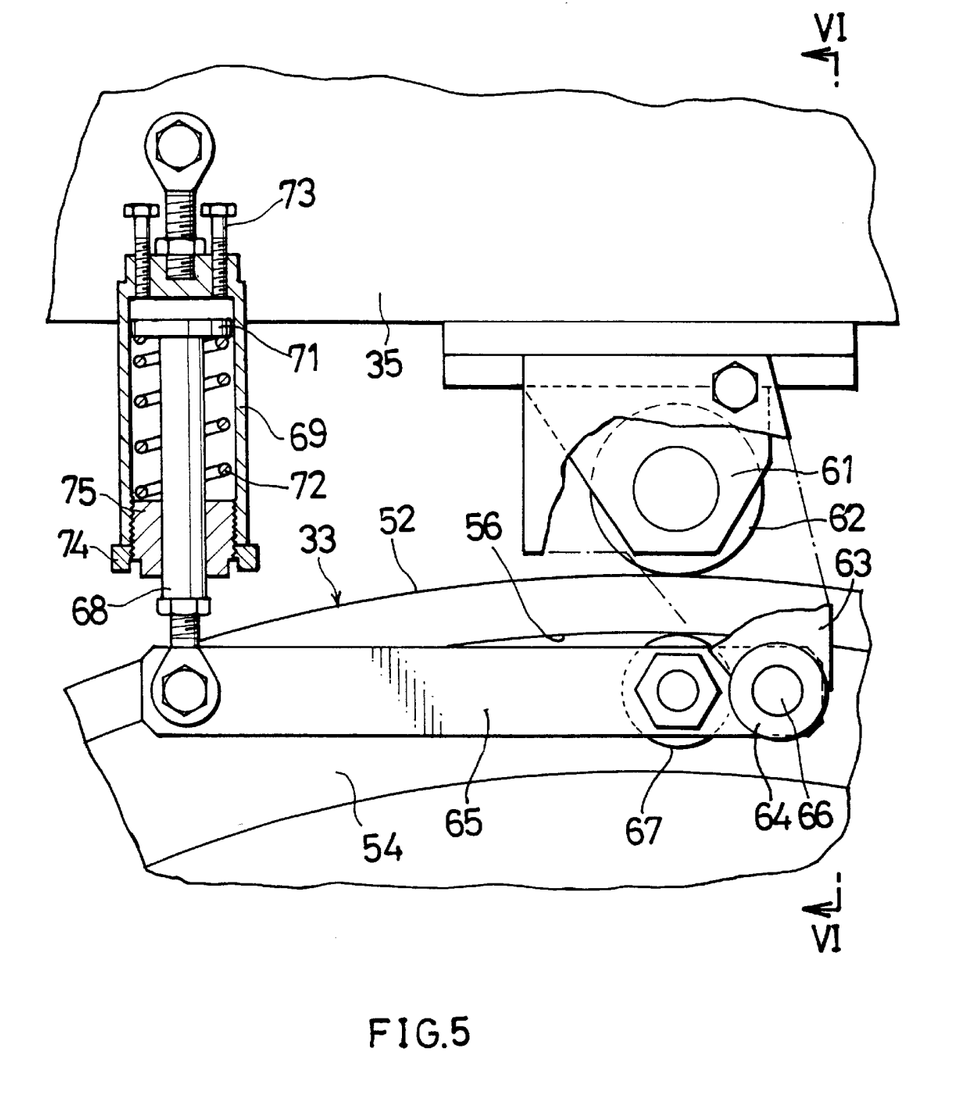
FIG. 5 is an enlarged fragmentary side elevation of the portion shown in FIG. 3.
Figure 6:
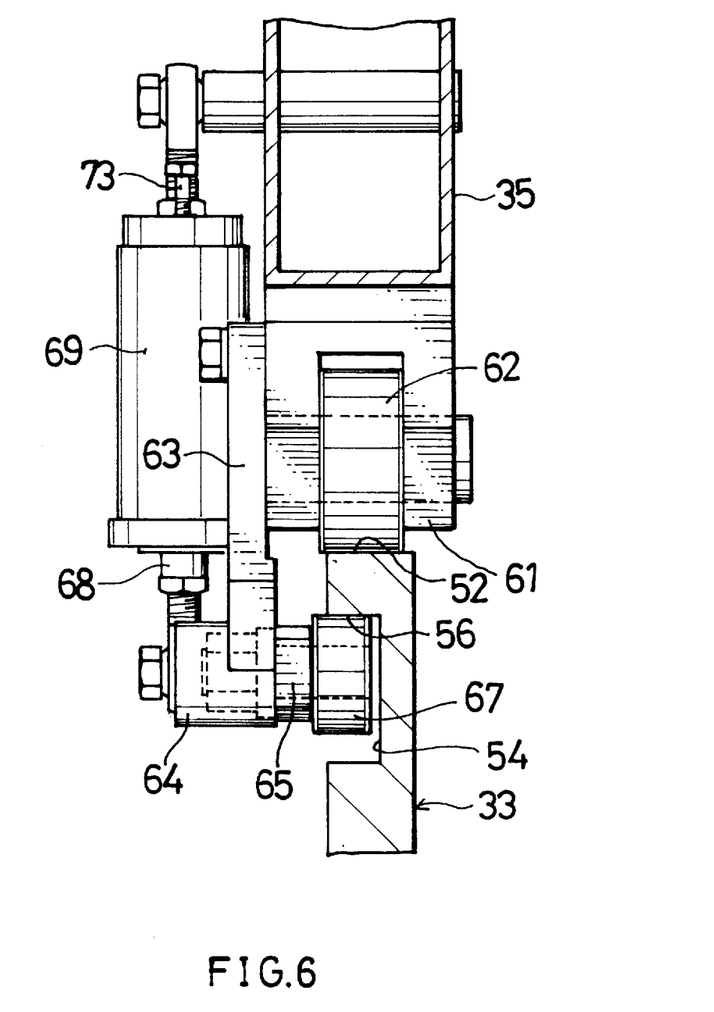
FIG. 6 is a view in section taken along the line VI—VI in FIG. 5.

With reference to FIGS. 5 and 6, the right jaw unit cam follower 35 is provided at a lengthwise intermediate portion thereof with a bifurcated bracket 61 extending downward from the follower. A fixed roller 62 bearing on the cam contour face 52 is mounted on the bracket 61. Fixed to the right side (shown as the left side in FIG. 6) of the bracket 61 is a lever suspending plate 63 extending downward therefrom and having a lower end opposed to the annular recessed portion 54 from the right side thereof. A horizontal guide sleeve 64 is secured to and projects rightward from the lower end of the suspending plate 63. A roller lever 65 extending rearward is disposed at the left end of the guide sleeve 64 and has at its front end a horizontal pivot 65 projecting rightward and rotatably fitted in the guide sleeve 64. In the vicinity of the pivot 66, a movable roller 67 bearing on the guide face 56 is mounted on the roller lever 65 as if projecting leftward therefrom. A vertical pull-up rod 68 has a lower end pivoted to the rear end of the roller lever 65. A vertical tubular spring housing 69 provided with a top wall has an upper end pivoted to the cam follower 35 and an open lower end with a male screw member 75 driven therein. The pull-up rod 68 has an upper portion extending into the spring housing 69 through the screw member 75. A retaining nut 74 is screwed on the screw member 75. The pull-up rod 68 is formed with a flange 71 at its upper end. A roller restraining compression spring 72 is provided between the screw member 75 and the flange 71. Spring holding bolts 73 for releasing the roller 67 extend through the top wall of the spring housing 69 in screw-thread engagement therewith.

The compression spring 72 biases the pull-up rod 61 upward, thereby urging the roller lever 65 to pivotally move upward about the pivot 66. As a result, the fixed roller 62 is pressed against the cam contour face 52 and the movable roller 67 against the guide face 56.

With the movable roller 67 pressed against the guide face 56, a clearance is formed between the pull-up rod 68 and the holding bolts 73. The bolts 73, when forced down in this state, produce a clearance between the movable roller and the guide face 56, thereby releasing the followers 34, 35 from the respective cams 32, 33 and permitting the operator to perform required work such as removal of the followers 34, 35.

Like the right jaw unit cam follower 35, the left jaw unit cam follower 34 is also provided with a fixed roller 62, movable roller 67, etc.

The rotational motion of the drive shaft 31 is converted by the two cams 32, 33 and cam followers 34, 35 into reciprocating motions, which are delivered respectively to the vertical rods 21 of the two jaw units 11, 12. As a result, the jaw unit 11 is lowered with their pivotal arms 23 closed, while the other jaw unit 12 is raised outside the closed pivotal arms 23 of the jaw unit 11, with their pivotal arms 23 opened.

The torque of the drive shaft 31 is great when raising the jaw units 11, 12, and is small when lowering the jaw units 11, 12. While the drive shaft 31 rotates through 360 degrees for one cycle, the drive torque reaches a maximum value and a minimum value each twice. These torque variations are represented by a curve P in FIG. 7.

With reference to FIG. 3, when the drive shaft 31 makes one turn of clockwise rotation, the driven shaft 42 is rotated counterclockwise two turns. One turn of rotation of the driven shaft 42 rotates the arm 44 therewith, causing the piston rod 46 of the hydraulic cylinder 45 to perform a stroke of to-and-fro movement. The advance of the piston rod 46 is effected against the pressure of pressurized air and therefore reduces the torque of the drive shaft 31. Conversely, the retraction of the piston rod 46 takes place in conformity with the air pressure, consequently increasing the torque of the drive shaft 31. Thus, the torque varies as represented by a curve Q (approximate sine curve) in FIG. 7.

FIG. 3 shows the right jaw unit cam 33 as positioned at a border between the ascent range U and the descent range D and the arm 44 as directed rearward, with the piston rod 46 of the hydraulic cylinder 45 in a retracted limit position. At this time, the right jaw unit 12 is in its upper limit position. The right jaw unit cam 33, when rotated through 270 degrees from the position of FIG. 3, moves past the descent range D to reach another border between the descent range D and the ascent range U, bringing the right jaw unit 12 to its lower limit position. In the meantime, the driven shaft 42 is rotated through 540 degrees, i.e., one and a half turns. When the rotation of one and half turns is divided into three half turns, the torque of the drive shaft 31 is successively reduced, increased and reduced every half turn.

The right jaw unit cam 33 is brought to the state of FIG. 3 when rotated through 90 degrees from the border between the descent range D and the ascent range U. More specifically, the cam 33 moves past the ascent range U and the descent range D, raising the right jaw unit 12 to its upper limit position. In the meantime, the drive shaft 42 is rotated through 180 degrees, turning the arm 44 from a forward to a rearward direction to retract the piston rod 46 of the cylinder 45 and consequently increasing the torque of the drive shaft 31.

When raising the right jaw unit 12, the drive torque reaches a maximum value, whereas the increase in the torque of the drive shaft 31 by the hydraulic cylinder 45 diminishes the maximum value.

When the drive shaft 31 is rotated through 180 degrees, the left jaw unit 11 now reaches its upper limit position. In the meantime, the driven shaft 42 is rotated through 360 degrees, i.e., one turn. Accordingly, every time the driven shaft 42 makes a full rotation through 360 degrees, the torque of the drive shaft 31 is increased, whereby the variations in the torque of the shaft 31 are reduced, permitting use of a motor of decreased capacity for driving the drive shaft 31.

Figure 7:
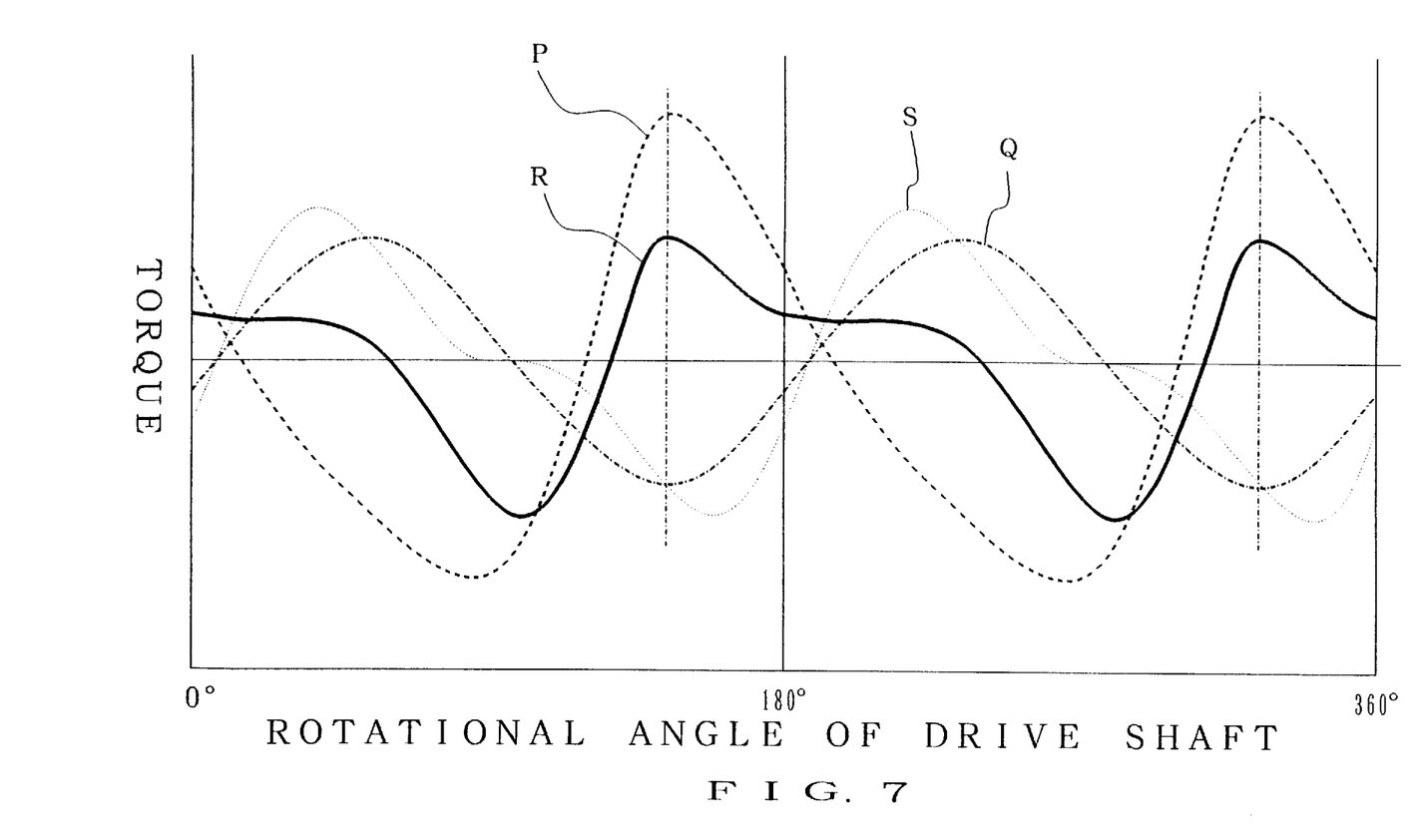
FIG. 7 is a graph showing torque variation curves of a drive shaft.

With reference to FIG. 7, the positive maximum value of the curve P conincides with the negative maximum value of the curve Q (the dot-and-dash line in FIG. 7). The curve P and the curve Q, when combined, make a curve R, and the positive maximum value of the curve R is considerably lower than the positive maximum value of the curve P. This indicates that the torque variations are diminished. An equivalent effect is also available by making the zero point of the curve P coincide with that of the curve Q instead of making the positive maximum value of the curve P coincide with the negative maximum value of the curve Q.

During the ascent or descent of the jaw unit 11, 12, some trouble is likely to occur to overload the units 11, 12 with the tendency for the cam followers 34, 35 to leave the cams 32, 33. In such a case, the roller restraining compression spring 72 is compressed to cause the lever pull-up rod 68 to project from the spring housing 69 and release the fixed rollers 62 from the cam contour faces 51, 52 although the movable rollers 67 remain in contact with the guide faces 55, 56.

Modifications of the drive mechanism 13 will be described next.

Figure 8:
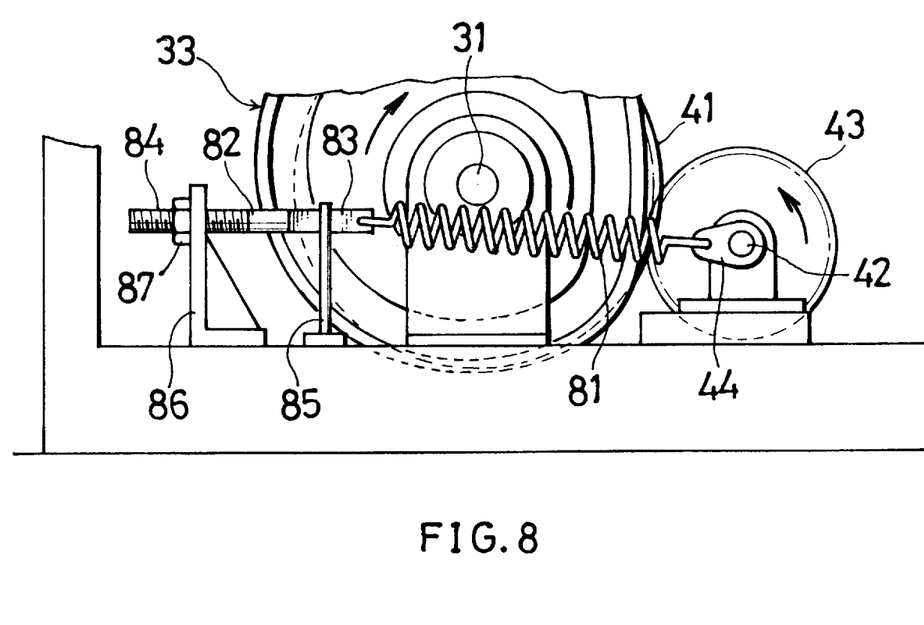
FIG. 8 is a side elevation corresponding to FIG. 3 and showing a modified drive mechanism.

Although the hydraulic cylinder 45 is used as the means for giving a torque to the driven shaft 42 according to the foregoing embodiment, FIG. 8 shows a modification wherein a coiled tension spring 81 is used. The tension spring 81 has a front end attached to the outer end of the arm 44 and a rear end attached to the front end of a spring force adjusting horizontal rod 82 extending longitudinally of the apparatus. The adjusting rod 82 has a cutout 83 in a front portion thereof and is in the form of a male screw 84 in the rear of the cutout. The cutout 83 has a vertical flat-surfaced bottom, against which a vertical retaining rod 85 bears. The male screw 84 has a rear end portion extending through a vertical support bracket 86 to project rearward beyond the bracket. A spring force adjusting nut 87 serving also as a stopper is screwed on the rear projecting portion of the male screw 84.

With the rotation of the arm 44, the spring 81 stretches or contracts, giving a varying spring force. The elastic force to be applied to the outer end of the arm 44 therefore varies. Accordingly, the torque produced in the driven shaft 42 is represented by a curve S in FIG. 7, i.e., a slightly modified sine curve.

Figure 9:
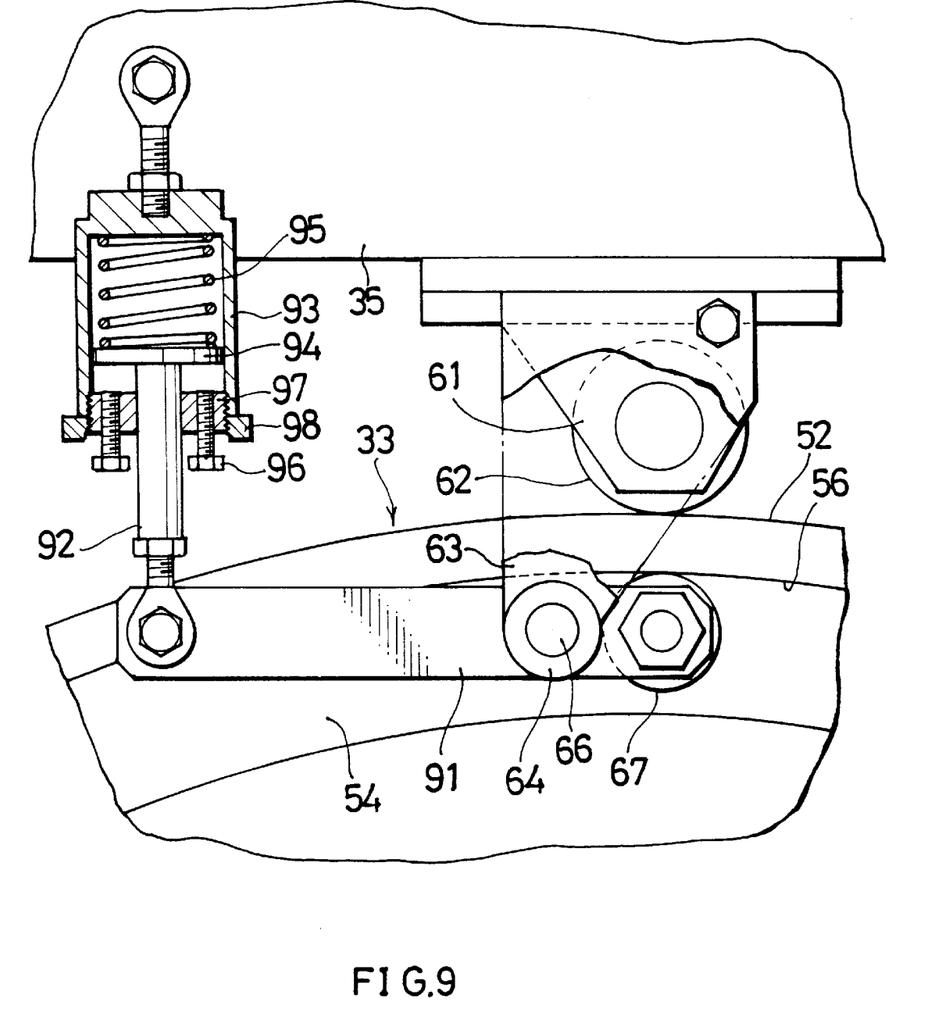
FIG. 9 is a side elevation corresponding to FIG. 5 and showing another modified drive mechanism.

With reference to FIG. 9, a different roller lever 91 is used in place of the roller lever 65 included in the foregoing embodiment. The roller lever 91 has the movable roller 67 mounted on its front end and is supported by the pivot 66 at a portion thereof close to the lever front end. A vertical depressing rod 92 has a lower end pivoted to the rear end of the roller lever 91. As in the foregoing embodiment, a vertical tubular spring housing 93 provided with a top wall has an upper end pivoted to the cam follower 35 and an open lower end with a male screw member 97 driven therein. The depressing rod 92 has an upper portion extending into the spring housing 93 through the screw member 97. A retaining nut 98 is screwed on the screw member 97. The depressing rod 92 is formed with a flange 94 at its upper end. This modification differs from the foregoing embodiment in that a roller restraining compression spring 95 is provided between the top wall of the spring housing 93 and the flange 93, and that spring holding bolts 96 are screwed into the male screw member 97.

Various modifications of the foregoing embodiment will be described below.

Sprockets are usable as the main gear and the driven gear instead of spur gears. A chain or toothed belt is then reeved around the sprockets.

Although the lift frames are two in number and one turn of rotation of the drive shaft involves two cycles of torque variations with the embodiment described, the number of lift frames does not always correspond to the number of torque variation cycles. When the number of lift frames is 2, the number of torque variation cycles can be, for example, 1 or 3.

In the case of one cycle of torque variations, the arm may be secured to the drive shaft, with the driven shaft omitted, or the arm may be secured to the driven shaft provided. The gear ratio of the main gear to the driven gear is then 1:1.

When the driven shaft is provided to which the power of the drive shaft is transmitted by the main gear and the driven gear as in the latter case, the timing of the driven shaft relative to the drive shaft is variable as desired by altering the meshing phase of the two gears so as to achieve the highest effect to reduce the torque variations.

In the case where the number of torque variation cycles is at least 3, the gear ratio of the main gear to the driven gear is n (integer) which is at least 3 and corresponds to the cycle number to 1.

The present invention is applicable, for example, to packaging machines for milk packs of the gabled top type. In this case, the lift frame of the above embodiment is replaced by a lift unit comprising a filling piston of a filling device and a container lift. The interval between the two lift units to be moved up and down is not always 180 degrees but can be, for example, 150 degrees.

Furthermore, the lift units to which the present invention is applicable can be those comprising any mechanical element and having an up-and-down stroke.

What is claimed is:

1. In a drive apparatus having a drive shaft for causing n lift units to each perform one cycle of up-and-down movement at a specified interval by one rotation of the drive shaft, where n is an integer greater than zero, a device for reducing torque variations comprising:

elastic means for providing an elastic force; and transmission means for transmitting the elastic force of said elastic means to the drive shaft as a rotational torque, wherein the transmission means comprises a main gear fixed to the drive shaft, a driven gear coupled to the main gear for power transmission therebetween, a driven shaft having the driven gear fixed thereto, and an arm fixed to the driven shaft and having a forward end for the elastic force of the elastic means to act upon, and when the number of cycles of torque variations involved in one turn of rotation of the drive shaft is n, the gear ratio of the main gear to the driven gear is n:1.

2. The drive apparatus as recited in claim 1, wherein n=2 and the torque of the drive shaft is adapted to reach a positive maximum value and a negative maximum value each twice alternately during the rotation of the drive shaft through 360 degrees for one cycle, and wherein the torque of the driven shaft reaches a positive maximum value and a negative maximum value each once during the rotation of the driven shaft through 360 degrees for one cycle, the gear ratio of the main gear to the driven gear being 2:1, the drive shaft and the driven shaft being so timed as to be approximately reverse in the phase of their positive and negative torque maximum values.

3. The drive apparatus as recited in claim 2 wherein the 360-degree cycle of the drive shaft includes 90-degree rotation assigned to an ascent stroke of at least one of the lift units, with the remaining 270-degree rotation assigned to a descent stroke of the lift unit.

4. The drive apparatus as recited in any one of claims 1, 2, 3, wherein said elastic means comprises a hydraulic cylinder having a piston rod connected to a forward end of the arm.

5. The drive apparatus as recited in any one of claims 1, 2, 3, wherein a spring is interposed between a forward end of the arm and a support member.

6. The drive apparatus as in either claim 1 or claim 2 wherein the main gear and the driven gear are each a spur gear and are in mesh with each other.

7. The drive apparatus as recited in either claim 1 or claim 2 wherein the main gear and the driven gear are each a sprocket, and a chain or toothed belt is reeved around the main gear and the driven gear.

* * * * *